United States Patent
Gorski-Popiel

(10) Patent No.: US 7,760,139 B1
(45) Date of Patent: Jul. 20, 2010

(54) GPS BASED ATTITUDE REFERENCE SYSTEM

(75) Inventor: George Gorski-Popiel, Hilton Head, SC (US)

(73) Assignee: Massachusetts Institute of Technology, Cambridge, MA (US)

( * ) Notice: Subject to any disclaimer, the term of this patent is extended or adjusted under 35 U.S.C. 154(b) by 220 days.

(21) Appl. No.: 11/963,620

(22) Filed: Dec. 21, 2007

Related U.S. Application Data

(63) Continuation-in-part of application No. 11/539,595, filed on Oct. 6, 2006, now abandoned.

(51) Int. Cl.
G01S 19/53 (2010.01)
G01S 19/37 (2010.01)

(52) U.S. Cl. .............................. 342/357.36; 342/357.77

(58) Field of Classification Search ............ 342/357.11, 342/357.04
See application file for complete search history.

(56) References Cited

U.S. PATENT DOCUMENTS

| | | | | |
|---|---|---|---|---|
| 5,072,227 A | * | 12/1991 | Hatch | 342/357.04 |
| 5,548,293 A | * | 8/1996 | Cohen | 342/357.11 |
| 6,140,963 A | * | 10/2000 | Azzarelli et al. | 342/442 |
| 6,181,911 B1 | * | 1/2001 | Sih et al. | 455/12.1 |
| 7,545,894 B2 | * | 6/2009 | Ziedan et al. | 375/347 |
| 2003/0108126 A1 | * | 6/2003 | Akopian | 375/326 |

OTHER PUBLICATIONS

Xu, Jiangnin et al, "GPS Attitude Using a Genetic Algorithm," Proc. of the 2002 Congress on Evolutionary Computation, May 2002, pp. 998-1002.*

* cited by examiner

*Primary Examiner*—Gregory C Issing
(74) *Attorney, Agent, or Firm*—Mark P White

(57) ABSTRACT

A method for determining the attitude of a stabilized platform having three or more antennae includes, for each antenna, front-end processing a GPS signal received, the front-end processing including down-converting a GPS source signal by heterodyning and direct sampling, then sampling the down-converted signal. For each antenna the GPS signal is acquired by faster-than-real-time correlating the down-converted signal with each of a number of stored codes and correlating with each of a number of Doppler frequencies. The correlation is repeated for a smaller range of Doppler frequencies, and for smaller intervals of code phases. The down converted signal is then stripped of its codes, and the phases of the resulting signals from each antenna are subtracted, providing the phase differences between antennas, which are converted into attitude angles.

11 Claims, 9 Drawing Sheets

GPS BASED ATTITUDE REFERENCE SYSTEM

This application is a continuation-in-part of U.S. patent application Ser. No. 11/539,595, filed on Oct. 6, 2006, now abandoned and which is incorporated herein by reference in its entirety.

FIELD OF THE INVENTION

This invention relates to the field of attitude control of a moving platform, and more specifically to measuring the attitude of the platform by means of electronic signals generated by GPS satellites.

BACKGROUND OF THE INVENTION

The initial impetus to the work here described came from the military requirement to communicate over the MILSTAR system, whilst moving, in a ground vehicle, over rough terrain. The scheme is referred to as 'Comm On The Move' or simply COTM. The MILSTAR system employs a set of geostationary satellites and the ground terminals require dish antennas of sufficient size to concentrate the 3 dB signal beam-width within less than 1°. To successfully communicate over this system, it is essential that the antenna be pointed at the satellite at all times and not be permitted to deviate by more than 0.5° from bore-sight. Since the antenna will be mounted on a platform connected to the vehicle it would be impossible to communicate over the link unless a stabilization system was employed which detects and adequately cancels the vehicle movement. Such a system would be composed of two parts:

1. The accurate and timely estimation of the antenna platform attitude with respect to some convenient frame of reference, and
2. A mechanical assembly comprising servo systems and actuators which can use the gathered attitude data to stabilize the antenna platform. The system to be described is an attempt at a solution to the first part.

The Known State of the Prior Art

The basic concept underlying GPS based attitude angle determination is that of interferometry, which basically measures some attribute of signals received at two (or more) points separated a know distance apart. These attributes and their differences contain information about the inclination of the plane on which the signals were gathered. In the case of GPS interferometry the relevant attributes are the phases of the carrier wave received at a set of antennae.

Various means of implementing GPS interferometry have been proposed over the last 20 years or more. Numerous patents exist each claiming some improvement to the state of the art. But as far as is known, all prior art on the subject have a common feature. They are all based on the assumption that the basic vehicle to be used is the conventional GPS receiver, a functional block of which is shown in FIG. 1.

Referring now to this Figure, the Front End 2 amplifies, filters and down-converts the signal received by the antenna 1 producing the output $S_x$ which is a superposition of signals from all GPS satellites in view. Quadrature Correlation and Code Stripping further reduces the frequency, and then a selection, under computer control, of a particular satellite PN code, permits a search for the proper code phasing and when that is found a simple multiplying action strips that code from the signal. This process is frequently referred to as Initial Acquisition. This process also enhances the signal to be at least 20 dB stronger than any of the un-stripped signals. The process is repeated for all possible satellites.

The outputs of the Quadrature Correlation and Code Stripping process, $C_s(j)$ are the carrier signals for all the j satellites in view. These are next processed in a Phase Locked Loop (PLL) 4 to keep the carrier phase in track, a Frequency Locked Loop (FLL) 5 to stay on the correct frequency and a Delay Locked Loop (DLL) 6 to keep the PN code phasing properly aligned. The PLL 4 also reads the navigation data which is bi-phase modulated on the carrier phase.

The outputs from all of these feedback loops, plus other relevant parameters are passed on to a computer, which processes the data, generates the required outputs and provides controls for the rest of the system.

The use of the three feedback loops, enclosed in dotted lines, imposes certain restrictions on the receiver performance. A closed loop tracking system must have a finite bandwidth, which implies a finite reaction time, usually referred to as 'settling time', which is inversely proportional to the loop bandwidth. As that bandwidth increases, the settling time shortens. Another factor crucially affecting settling time is the type and order of the frequency selectivity of the loop. The usual choices here are second order loops and Butterworth frequency responses.

The required settling time can only be meaningfully defined when the required final output accuracy is specified. A phase locked loop's settling time for the output to be within 0.1° of the true value will be substantially longer than that to within say 10°, everything else being the same.

From the settling time perspective, the larger the bandwidth used the better. Unfortunately, as bandwidth increases so does the amount of noise entering the system. A point can be quickly reached where the noise is so excessive that no useful information can be extracted from the available data. Therefore noise considerations and settling times must be balanced to reach some optimal compromise. No general value can be given for optimal bandwidths, because that depends on system requirements, the operational environment and final goals. For example Babitch (U.S. Pat. No. 5,347,286) states that for his application a 1 KHz loop bandwidth is the largest that can be tolerated. Figures of that order of magnitude would realistically apply to most prior art systems.

A 1 KHz, conventionally designed, phase locked loop with output accuracy of the order of 1° of phase, would typically settle in tens, or possibly hundreds of milliseconds. Similar considerations hold for all of the other feedback loops employed.

The prior art receiver's main function is to measure the transit time of the signal from at least four satellites and to translate these transit times into a range measurement, as depicted in FIG. 2.

The coordinate system usually used in GPS work is the Earth Centered Earth Fixed (ECEF) system. This defines the X-axis as the line joining the earth center and the intersection of the Greenwich meridian and the equatorial plane, the Z-axis as the line from the earth's center to the North Pole and the Y-axis as the direction orthogonal to the other two axes depicted in FIG. 2.

Still referring to FIG. 2, once the four ranges $R_1, R_2, R_3, R_4$ have been measured then, since the exact position of the satellites is known, the position of the GPS receiver can be determined by triangulation. However these ranges can also be used for interferometric processing. If the receiver is capable of collecting range measurements at two or more antennae, then the difference in the range measurements as seen by the different antennae will contain information about the inclination of the platform on which the antennae are mounted. This is the embodiment of the well-known prior-art interferometric principle, as applied to GPS receivers.

However, the scheme can only be usefully applied to attitude determination if it can be shown that the ranges can be established with adequate accuracy. This accuracy issue may be understood by next referring to FIG. 3.

The two antennae A and B in FIG. 3 are a distance D apart and the range from the satellite to A and B must be measured with sufficient accuracy to ensure that the angle α can be determined to within a deviation of no more than δ°. Then it follows on inspection of FIG. 3 that d must be less than D·tan(δ). This will define the required range accuracy. As an example let us assume that δ=0.5° and the antenna separation is 1 meter. Then the value of d must be less than 8.7 millimeters. That is an extreme accuracy, considering that the satellite to observer distance is about 20,000 km.

The principle used here to achieve this is as follows: Consider an ideal system, no noise, no losses and everything is stationary. Then the distance of the antenna from the satellite can be expressed as an integer multiple of wavelengths of the transmitted signal plus a fraction of a whole cycle multiplied by the wavelength. If the phase measured at the antenna is $\phi_a$, then the distance between the antenna and the satellite will be $(\phi_a/360)\cdot\lambda+N\cdot\lambda$. The wavelength λ is known precisely, N will be an integer, which once determined, will be completely precise, so the only noise in this measurement will come from the noise imposed on the phase $\phi_a$. For a satellite carrier frequency of 1575.42 MHz, a 1 mm range precision implies phase knowledge to within 1.89°, which is not very difficult to achieve. The only problem remaining here is the determination of the integer N. This issue is commonly referred to in the literature as the integer ambiguity problem.

In a real world situation where the satellite (and possibly the observer) is moving and there is noise and all sorts of distortions are present, the issue of integer ambiguity in the prior art is tackled in two steps. An initial acquisition procedure to determine N is followed by a carrier phase tracking loop arrangement to keep the correct integer up to date.

With the above as background it is now possible to give a meaningful list of problems/issues that have occupied the GPS interferometry community over the last 20 years or more and whose proposed solutions are the subject matter of all patents in this area.

Issues and Problems

1. Loop Settling Times

It is clearly highly desirable to perform the above calculations as soon as possible in most cases. To that end a lot of work has been done in balancing settling times and noise contributions.

2. Effective Noise Suppression

Noise suppression in the prior art has been addressed by resorting to optimal estimation methods. These include Kalman filtering, Maximum Likelihood Estimation and many others. These methods can get quite involved and they can also have a negative effect on settling times. Kalman filtering, for example, is essentially a mathematical embodiment of a tracking loop. A measured output is compared with an expected output based on the available knowledge of the noise statistics. The difference between the two is used to better predict the next expected output. The adequacy of this process hinges crucially on the correct knowledge of the noise statistics. These can be deduced from measurements but the estimation accuracy is proportional to the amount of data considered, which in turn means the longer one waits the better the results.

3. Integer Ambiguity.

This calculation can get very involved using measurement differences, double differences, Kalman filtering and Diophantine equations (equations with only integer solutions). Once established, the correct value of N must be maintained. This usually entails the use of a PLL which can also get complicated in that it must not only correctly measure phase but also take into account any possible 'cycle slipping'. A cycle slip is a common occurrence in phase locked loops and is frequently not an issue. Here a cycle slip means one, or several cycles of phase difference before and after the slip, in other words a possible change in N by some integers, an unacceptable situation. A lot of work has been done in this area in the prior art.

4. Phase Ambiguity.

This is another ambiguity, which comes about because of the way phase angles must be processed. Whenever mathematical operations involving phase angles have to be performed it is essential to use modulo 360° arithmetic. This means that if, for example, the true phase output is 460° it will register only as a 100° phase output, giving a wrong answer. The resolution of such ambiguities, especially for very large possible true phase values, can get extremely involved.

5. Range Accuracy

As illustrated above, the range accuracy required by interferometry is in the millimeter range or better. Besides the obvious effects of noise and its suppression, which has already been described above, there is another issue which may become relevant: temperature induced changes. Especially if the antennae are mounted on metal platforms, temperature induced expansion and contraction may well be at the millimeter level or higher. Some means of compensation may therefore become necessary.

6. Differential Delays

At the frequencies of interest (1575.42 MHz) a delay error of 1 picosecond is equivalent to a phase error of 0.567°. Equivalently, a 1 millimeter difference in two cables will produce a phase difference of 1.89°. These are very small differences, producing relatively large effects. Great care must be taken to deal with these issues.

7. Cost

Conventional designs based on the principles outlined above, will tend to be costly, both in materials and maintenance. To reduce costs the drivers should be simplicity and robustness of design and reliance on proven, well understood sub-systems and processing methods.

Requirements of the Present Invention

With all of the above as background it is now possible to discuss the novel features claimed in the proposed patent.

As stated above, the military have a requirement for very accurate pointing of an antenna, whilst moving in a ground vehicle over rough terrain. The issue whether acceptable solutions to problems of this nature exist, hinge totally on the specific requirements that must be met.

Road tests conducted by the military have established worst case angular rotations for a moving vehicle about three orthogonal axes. Assuming the x-axis to be in the direction of the vehicles motion, the y-axis at right angles to that and the z-axis in the up-down direction, then the worst case changes about the x, y and z axes per second were found to be 15°, 60° and 30° respectively. This implies that the slowest update rate must be in excess of 100 times a second to permit a worst case change (about the y-axis) of 0.5°. So a receiver producing an attitude estimate to about 0.1° every 5 msecs would be needed. An inexpensive receiver meeting these requirements is the subject of this invention. No such solution appears to be available in the prior art.

An Attitude System for COTM

It has become clear that, if a GPS based solution meeting the above requirements is possible, all conventional GPS receiver designs are unacceptable. Closed feedback tracking loops, Kalman filtering or other sophisticated noise mitigation processing, complex integer ambiguity reduction processing, must be dispensed with if the solution update rate and low cost goals are to be met. It will be demonstrated that the proposed system solves/satisfies all of the problems/issues listed above.

The system to be described here is a novel design with little in common with GPS receivers as they are known today, although its sub-systems are made up of conventional parts and use conventional techniques. Nevertheless the combination of these conventional parts and techniques produce an end product which is both novel and non-obvious, and which will meet specifications unreachable by any other GPS based attitude system currently described, known or available in the prior art.

SUMMARY OF THE INVENTION

It is an object of the present invention to calculate the attitude of a platform, relative to a convenient coordinate system, which is subjected to rapid, sudden movements of the type characteristic of the movement of land vehicles over rough terrain.

In accordance with a first aspect of the invention, the platform contains three or more antennae.

In accordance with a second aspect of the invention the signals produced by GPS satellites are detected by each of the antennae, and phase based interferometry calculations are used to calculate the platform attitudes.

In accordance with a third aspect of the invention the satellite signals are detected by a front end, which down converts the signals in frequency and samples them.

In accordance with a fourth aspect of the invention, the output of the front end is processed by a coarse acquisition system, which determines which of a number of possible P/N codes (unique to each satellite), each with a corresponding Doppler frequency, are present in the signals.

In accordance with a fifth aspect of the invention, the satellites whose P/N codes have been detected and whose signals exceed an acceptability threshold are selected for further processing.

In accordance with a sixth aspect of the invention the signal of the selected satellites are subjected to fine processing using phase correlation, which calculates a more accurate Doppler frequency, and a more accurate synchronization of the P/N code.

In accordance with a seventh aspect of the invention the signals output from the phase correlation at each antenna are subtracted from the phase correlation signals output at the other antennae, producing phase differences of the signals thereby.

In accordance with an eight aspect of the invention, no feedback loops are used in the calculations, in order to provide calculation speeds sufficient for the application.

In accordance with a ninth aspect of the invention the phase estimates produced by the fine acquisition process for each antenna are subjected to a running averaging process which advances by one millisecond and averages over ten milliseconds.

In accordance with a tenth aspect of the invention, the slopes of the phase averages over some convenient time interval (~50 milliseconds) are computed permitting the estimation of received signal frequency down to a fraction of one Hz.

In accordance with an eleventh aspect of the invention both available GPS signals L1 (at 1575.42 MHz) and L2 (at 1227.6 MHz) can be used to produce a set of numbers, referred to as the d-set, which are instrumental in the elimination of the phase ambiguity and provide an indication of the presence (or absence) of multipath signals.

BRIEF DESCRIPTIONS OF THE DRAWINGS

These, and other aspects of the invention may be understood by referring to the drawings contained herein, in which:

FIG. 1. (Prior Art) depicts a block schematic of a typical GPS prior art receiver.

FIG. 2. depicts Four Satellites and a GPS receiver in ECEF Coordinates.

FIG. 3. depicts the geometry of a system with Two Antennas at A and B.

FIG. 4A. depicts a schematic diagram of a single frequency front end for the present invention.

FIG. 4B. depicts a schematic diagram of a dual frequency front end for the present invention.

FIG. 5. depicts the strategy used in the coarse and fine code and frequency acquisitions.

AN OVERVIEW OF PRINCIPLES

Figure 1:
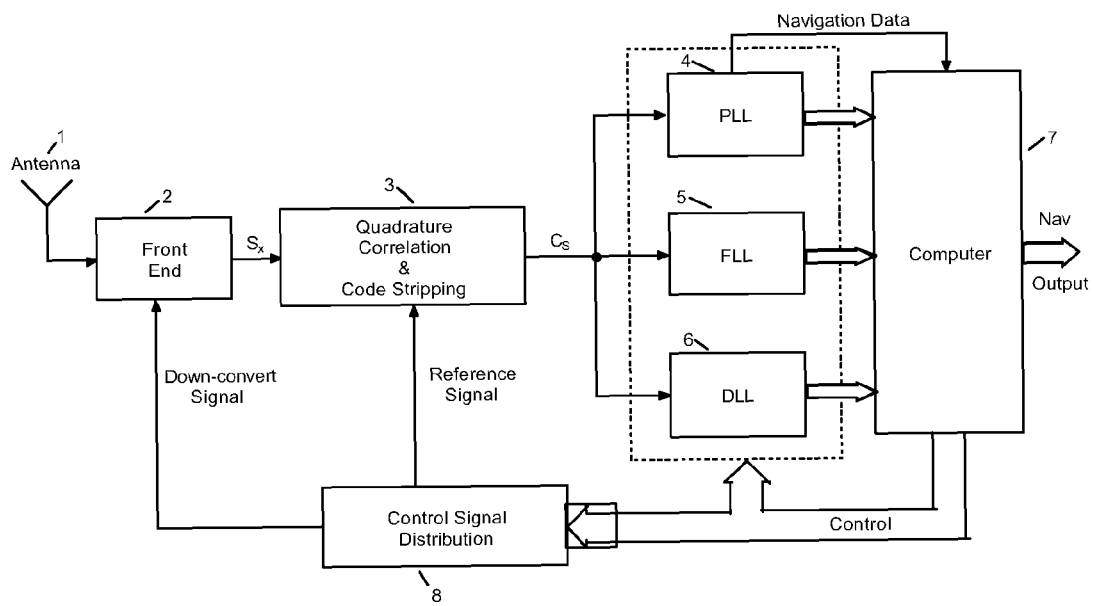
Figure 2:
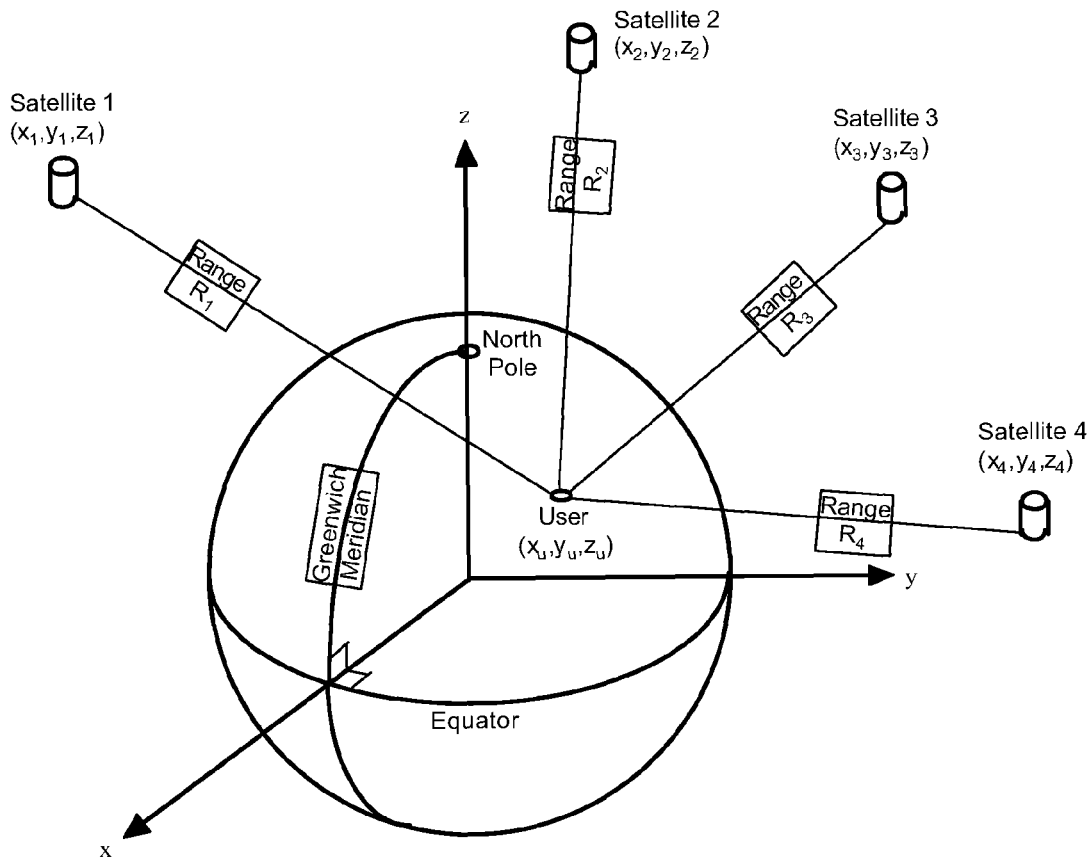
Figure 3:
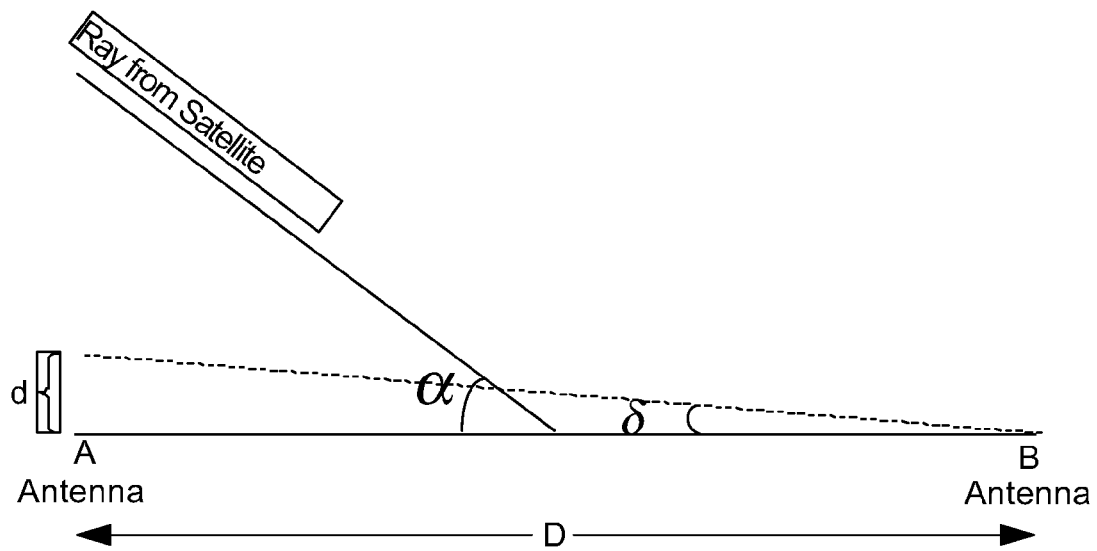

The underlying principle of the proposed system is that of interferometric comparison of phase of pure sinusoidal signals transmitted from an object of precisely known position and removed a large distance from the receiving antenna. These signals must be collected at three or more antennae mounted on a platform. The inclination of the platform with respect to some fixed coordinate system will be a function of the phase differences at the antennae and therefore will permit the determination of the platform attitude angles with respect to the coordinate system used.

The success or failure of such a scheme hinges crucially on two fundamental issues:

1. The availability of a distant source of signals containing pure sinusoids directly, or signals from which pure sinusoids can be extracted after some pre-processing.

2. An assurance that the pure sinusoids that can become available contain sufficient power to overcome the debilitating effects of the inevitably present noise to provide useful attitude information.

Signal which appear to be capable of satisfying these requirements are provided by the Global Positioning System (GPS). However considerable pre-processing is required before a pure sinusoid can be extracted from the signals actually broadcast from the GPS satellites.

The system described in this application is conceptually in three parts:

1. The acquisition and subsequent pre-processing of the received GPS signals to generate a set of four pure sinusoidal signals, at a convenient frequency, associated with each of four receivers connected to four antennae mounted on a platform.

2. The extraction of the phase angles from the pure sinusoids associated with the four antennae and the computation of attitude angles from the antenna phase differences.

3. Use of the attitude angles in the estimation of application specific final outputs. The main such output here would be the correct estimation of the pointing angles from the antenna platform to the MILSTAR satellite. However many other useful final objectives may also be met if platform attitude angles are available. One of these would be the creation of a universal 3-dimensional compass with the ability to indicate 3-dimensional direction, relative to the platform, at any number of points as long as their ECEF coordinates are known. Another, to provide antenna platform attitude synchronization data with respect to another platform with known motion. Finally, any other application where precise and rapidly updated attitude information is essential to meet required objectives.

DESCRIPTION OF THE PREFERRED EMBODIMENTS

Definitions

In the following description, the definitions below will be used.

t=Time parameter, which in the sampled domain becomes $n/f_s=n*T_s$ where n is the element enumeration number and $T_s=1/f_s$ is the duration of one sample.

C/A code=a Pseudo-Noise (P/N) code which modulates the satellite signal and which must be removed to turn it into a pure sinusoid. This is a vector composed of 1023 elements of magnitude +1 or −1, which are usually referred to as code chips. The code duration is exactly 1 millisecond, which is referred to as a code epoch (or just epoch). Therefore each code chip lasts 1/1.023 microseconds. This code is usually denoted by the letter M, or M(t), where t would advance in increments of 1/1.023 microseconds.

$K_s$=number of samples in one code epoch equal to the sampling frequency $f_s*10^{-3}$.

m(t)=Fine C/A code vector with $K_s$ elements. This is the C/A code vector sampled at $f_s$ and consequently its elements would be of duration $T_s$.

$m_k(t+\tau)$=The k-th fine C/A code having code phase offset τ elative to $m_k(t)$.

D=Ephemeris data modulation with a chipping rate of 20 milliseconds superimposed on the GPS signal.

$L_1$=Primary GPS signal at 1575.42 MHz $L_2$=Secondary GPS signal at 1227.6 MHz C/No=Carrier to Noise density. This is the preferred way to represent the strength of the received signal compared to the ever present noise. It is the ratio of the power in the signal to the power in the noise in one Hz bandwidth. Its magnitude is usually expressed in logarithmic scale dbHz.

$f_c$=satellite transmitted frequency ($L_1$ or $L_2$ signal) also referred to as the Carrier Frequency $f_x$=nominal down-converted frequency at the output of the front end which feeds the input to the signal processing section and which would be received if no Doppler offsets were present.

$f_D$=Doppler frequency resulting from satellite motion $f_{sig}$=actually received down-converted frequency at input to signal processing section=$f_x+f_D$ $f_s$=sampling frequency of front end $\omega_m$=the particular Doppler angular frequency of the current search bin=$2\pi f_m$ where $f_m$ is the current search bin frequency estimate of $f_{sig}$ φ=signal phase θ=the elevation angle to the satellite ϕ=azimuth angle to the satellite $S_x$=sampled signal output from front end The next described three processes: The Front End, Coarse Acquisition and Fine Acquisition are the pre-processing subsystems. With the information provided by them, pure sinusoids can be formed from the received signals.

The Front End

There are several versions of this sub-system which can be used here, all of which are well known in the prior art. The subsystem chosen in the preferred embodiment is depicted in FIG. 4A or 4B depending on whether single or dual frequency front ends are to be used.

Figure 4A:
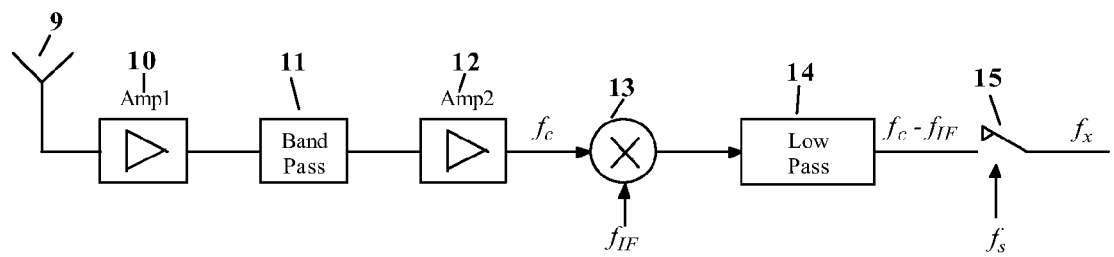
Figure 4B:
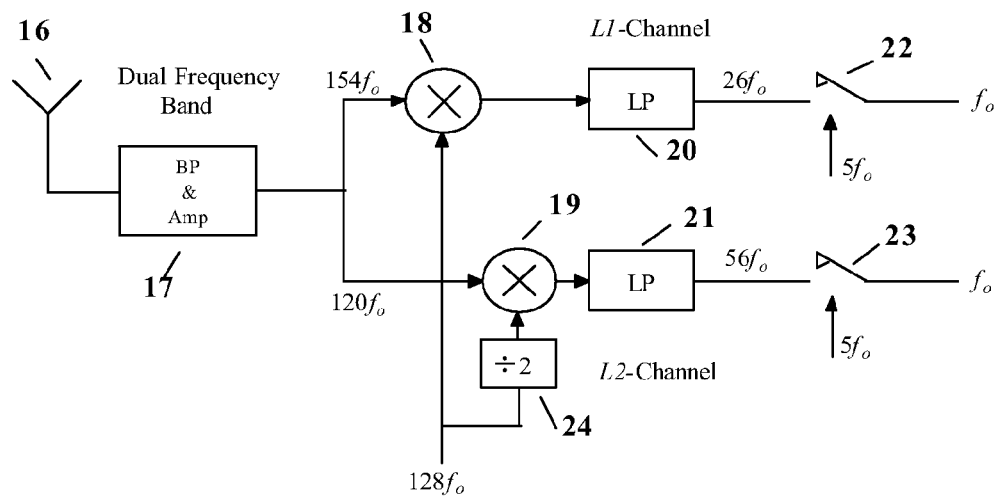

Referring now to FIG. 4A, a combination of a one stage heterodyne down-conversion and one stage of sub-sampling is shown. The above shows the frequencies as they appear in the signals at various stages of the system.

The modulated carrier signal is detected by antenna 9, and then passes through a preamplifier 10, followed by a bandpass filter 11, and a second amplifier 12. The resulting amplified and filtered signal, at carrier frequency $f_c$, is multiplied by the local oscillator signal, at frequency $f_{IF}$, in mixer (multiplier) 13, producing lower and upper sideband signals at frequencies $f_c-f_{IF}$ and $f_c+f_{IF}$ respectively. The low pass filter 14, allows only the lower sideband, at frequency $f_c-f_{IF}$, to pass. The resulting signal is then sampled by the sampling switch 15 at a sampling rate of $f_s$, resulting in the sampled output signal at frequency $f_x$.

The output frequency $f_x$ is related to all the others by $$f_x = f_c - f_{IF} - f_s \cdot \text{round}\left(\frac{f_c - f_{IF}}{f_s}\right) \tag{1}$$

Next we refer to FIG. 4B, the dual frequency embodiment of the front end. It is common usage to represent the $L_1$ and $L_2$ frequencies as multiples of a common frequency $f_o$=10.23 MHz. Then for $L_1$ $f_c$=154$f_o$ and for $L_2$ the carrier $f_c$=120$f_o$.

Referring to FIG. 4B, the same antenna 16 sends the modulated carrier signals $L_1$ and $L_2$ to the same combination of amplifiers and band pass filters as just described in FIG. 4A and here designated 17. The resulting signal is split into two parts, one, in the $L_1$ channel, which is mixed in multiplier 18 with oscillator signal having an IF frequency of 128$f_0$, while the other, in the $L_2$ channel, is mixed in multiplier 19 by a signal whose frequency is derived from 128$f_o$ but divided by two in 24 making it 64$f_0$. The outputs of the mixers are sent to low-pass filters 20, 21, resulting in signals whose carrier frequencies have been reduced to 26$f_o$ (for the $L_1$ channel) and 56$f_o$ (for the $L_2$ channel), respectively. These signals are sampled by sampling circuits 22 and 23, both of which sample at a frequency of 5$f_o$. In both cases the sampler outputs usually denoted by $f_x$ will be equal to $f_o$ as shown.

The output signals from the Front End are the inputs to the next sub-system. It should be noted that since all front ends proposed have a sub-sampling unit as the last stage, the data has been converted to digital form out the sampler output.

It has been amply demonstrated analytically in the literature and demonstrated by the proposed design that four bits of quantization is entirely sufficient for current performance requirements. The fewer the number of quantization bits the smaller and cheaper the final hardware. The preferred embodiment of the present invention therefore uses four bit quantized front end outputs.

The sampling frequencies $f_s$ may vary, but will usually be between 50 MHz and 100 MHz or more in the present embodiment. As an example, if the dual frequency scheme is used the sampling frequencies proposed in FIG. 4B are $5f_o=5*10.23$ MHz=51.15 MHz.

Coarse Acquisition

This section takes its inputs from the Front End. The functions performed by this sub-system are the same as those of the 'Quadrature Correlation & Code Stripping' unit shown in FIG. 1. Its function is to detect the presence of a satellite signal and provide coarse estimates of relevant parameters. The signal entering is a superposition of signals from all satellites visible, plus any multi-path reflections plus noise. The issue of multi-path will be dealt with later, but to explain the processing it will be assumed for the moment that no multi-path signals exist.

All satellites are in 12 hour orbits, so, even though the carrier frequency ($L_1$ or $L_2$) is known precisely, the actual frequency of the signal received will be changed by an unknown Doppler shift due to the motion of each satellite. The maximum deviation from the carrier frequency due to Doppler can be up to ±5 KHz.

Although all $L_1$ (or $L_2$) signals from every satellite have identical carrier frequencies each is bi-phase modulated by a unique Pseudo-Noise (PN) code (the C/A code) for that satellite, as well as by another bi-phase modulation designated D, bearing ephemeris information, which has chip transitions only once every 20 milliseconds, synchronized to epoch boundaries. This ephemeris data is not needed in the present embodiment of an attitude system, however its detection and subsequent elimination from the signals (in the Phase Acquisition sub-system) is essential to the proper operation of the present system, so in principle it could be stored in a memory and subsequently read and used in the same manner as is done in conventional GPS receivers. If that would be the case, the present attitude system could act as well as a fully operational conventional GPS receiver.

The cross-correlation properties of the C/A M codes have been carefully chosen to be optimally high for the code lengths used. Therefore, if the correct code phasing and true received frequency ($f_{sig}=f_x+f_D$) for a given satellite become known, multiplying the received signal by that code and correlating it with $f_{sig}$, will produce an output which will be at least 20 dB stronger than any cross-correlations with other components in the signal. If the signal to noise ration is high enough to permit detection, that particular satellite is considered to have been acquired.

Figure 5:
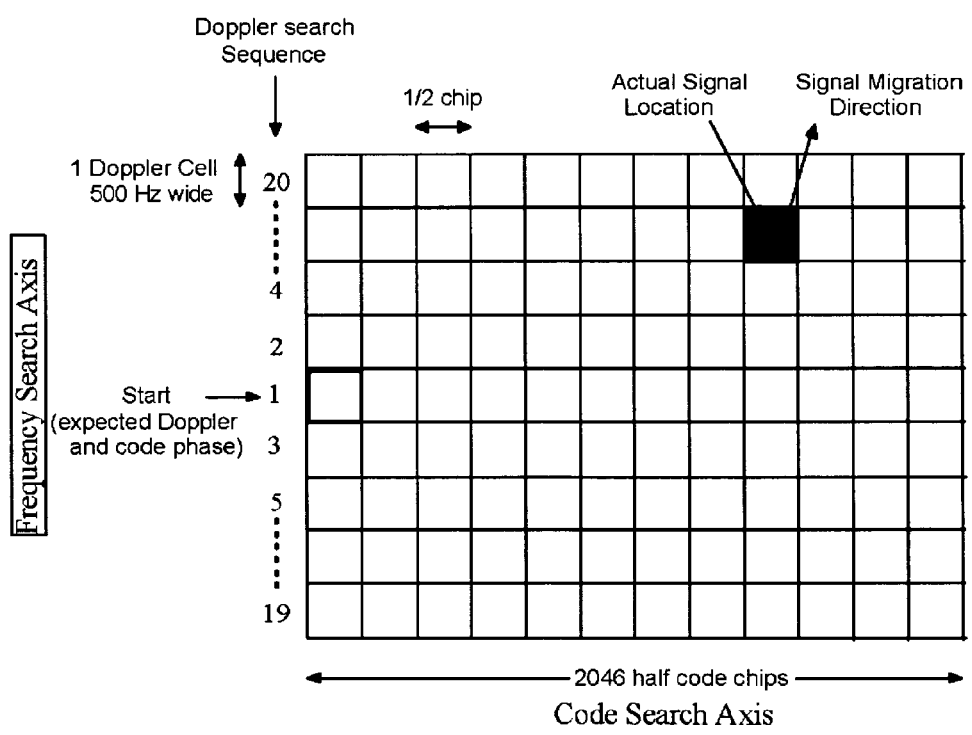

This scheme adopted to do the above is the 'brute force' search operation illustrated in FIG. 5. It consist of trying out all possible PN codes with all possible code phasings. The search, however must be conducted in such a manner, that if the satellite is indeed currently in view, it will be detected. This means that the search in code phase and in frequency must be conducted with fine enough resolution. On the other hand as few as possible steps would be desirable to get the search done as quickly as possible.

The code phase resolution required is readily seen to have to be in half code chip increments in order to ensure that at least one of the two possible samples per code chip does not fall on a transition between chips, which would give a very low correlation. Consequently, there are 2046 cells along the code search axis.

The width of the Frequency Axis step is defined by the maximum acceptable attenuation produced by being off frequency. If a figure of 3 dB is used, the value comes out to be about $\Delta f_D \sim 500$ Hz. The Doppler due to the vehicle's motion is:

$$f_{VD} = f_c \left( \frac{c - v_V}{c - v_{sat}} \right) \qquad (1)$$

where
$v_v$ is vehicle speed; and
$v_{sat}$ is the satellite motion component exactly away from the vehicle, which will be less than 8500 mph.

Assuming that the maximum rate of change in velocity is 60 mph in one second (in fact only high performance military aircraft are capable of such accelerations), then the change in Doppler $$\Delta f_{VD} = f_c \left( \frac{c}{c - v_{sat}} \right) - f_c \left( \frac{c - v_V}{c - v_{sat}} \right) \qquad (2)$$

$$\approx f_c \frac{v_v}{c}$$

since $v_{sat} \ll c$.

Substituting $v_v=60$ mph, $f_c=1575.42$ MHz, then $\Delta f_{VD} \sim 140$ Hz. For all lesser accelerations this value will be proportionally less. So, with a Doppler cell 500 Hz wide, the 140 Hz would not be very significant. Possible frequency changes will therefore be easily accommodated in the adopted scheme.

The search starts at some arbitrary point as shown in the figure and spends enough time on each cell to ensure, with an acceptably low probability of error that that particular cell either is or is not the combination of code phase and frequency that leads to an acquisition. This dwell time per cell $T_{dw}$ must also not be too long. Because of the motions of the GPS receiver and of the satellites, the location of the correct signal cell, shown in upper right hand corner of FIG. 5, will actually be migrating in some direction as indicated in the figure, and acquisition will only be successful if that migration produces only a minimal shift during the dwell time. It can be demonstrated that for land vehicles or any vehicle whose speed is known to within 30 mph, there will always be enough time to acquire a satellite signal with a totally adequate probability of success.

Figure 6:
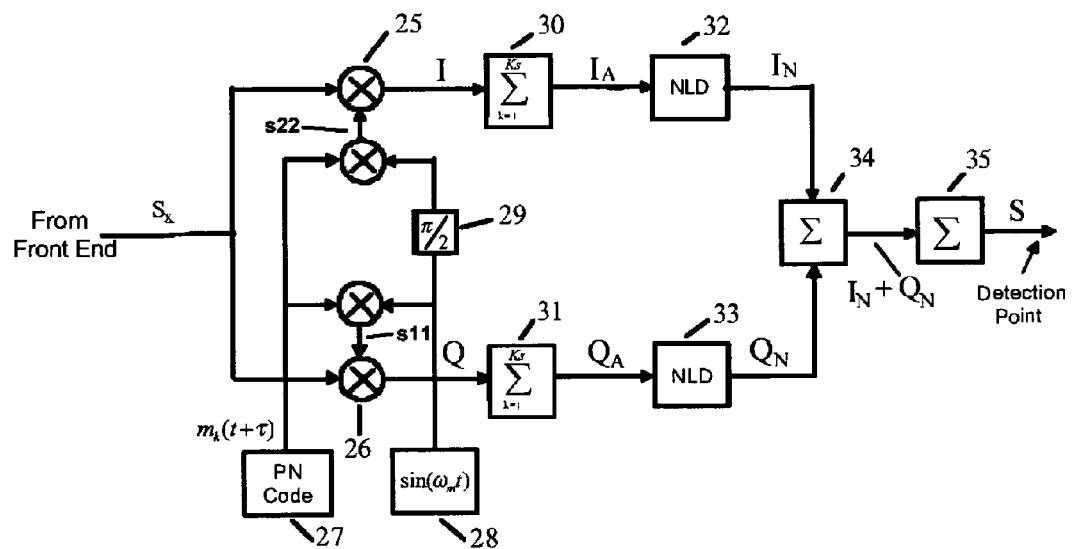
FIG. 6 depicts a schematic diagram of the hardware for both the coarse and fine acquisition subsystem of the present invention.

The preferred embodiment uses an implementation which is shown in FIG. 6. The front end output signal $S_x$ is multiplied in mixers 26 by both the k-th satellite fine PN code $m_k(t+\tau)$ and the signal $\sin(\omega_m t)$ where $\omega_m=2\pi f_m$. The frequency $f_m$ is a current best estimate of $f_{sig}$. The signal $\sin(\omega_m t)$ is put through a quadrature phase shifter 29 to produce $\cos(\omega_m t)$. This together with $m_k(t+\tau)$ are used in mixers 25 to multiply $S_x$. The outputs of these two sets of multiplications are designated I and Q for the upper and lower channels. One epochs worth of samples of both I and Q are added together in the summers 30 and 31 respectively to produce the outputs $I_A$ and $Q_A$ respectively. These are next put through two identical non-linear devices NLD in 32 and 33. Any even non-linear device can be used here, however square law or modulus NLDs will produce best results. If a square law device is used, then the NLD outputs $I_N$ and $Q_N$ would be $(I_A)^2$ and $(Q_A)^2$ respectively. These outputs are next summed in 34. This sum represents the coarse acquisition output S for one code epoch. Under conditions of good satellite signal strength, this may be sufficient for a satellite acquisition, for poorer signal strength this process may have to be repeated say k times for k successive epochs and then summed in the summer 35, the output of which is the signal S. This signal is subjected to a threshold test, if it exceeds the threshold a satellite has been acquired. Thus the value k may be 1 or anything up to 5, but longer integration times will not be used. If at k=5 there is no threshold crossing, this particular satellite is assumed not visible and the system goes on to the next satellite.

This amount of needed post-detection integration is based on an analysis, starting with a given probability of detection $P_D$, a probability of false alarm $P_{fa}$ and the carrier to noise density of the received signal $C/N_o$, which will usually be of the order of 40 dBHz or higher. It relates these three quantities to the amount of required post-detection integration, k. It can be shown that for $P_D$=0.99, $P_{fa}$=0.01 and a nominal $C/N_o$=40 dBHz, the required k~5. This holds for both modulus and square law non-linearities. These results have been verified by simulations.

In the present invention the code acquisition subsystem of FIG. 6 is implemented so that 1023 correlations are done in parallel, in a single clock cycle. The hardware required to do this is currently available and the design does not pose any special problems. The maximum number of such parallel correlations will be 2046*20*36 since the search must be done in half chip steps for 20 Doppler cells and 36 possible satellite codes must be searched for each code epoch. So, assuming one clock period to be $T_o$ seconds, the total time consumed for a complete maximal length acquisition is:

$T_{acq}$=2046*20*36*5*$T_o$=7365600*$T_o$=736.56 msecs

If the hardware clock used is 10 MHz ie $T_o$=100 nsec

Typically $T_{acq}$ will be half the value above because acquisition will on average be achieved after half the possibilities are searched. A 10 MHz working clock is easy to implement and, if required can be increased substantially. As a result coarse acquisition times of less than one second are readily achievable.

For all coarsely acquired satellites, the system will have an estimate of the C/A code to within half a C/A code chip and an estimate of the front end output frequency to within ±250 Hz. All of this information is passed on to the fine acquisition system shown in FIG. 7.

It should be noted that coarse acquisition takes place only once each time a new satellite appears over the horizon.

The implementation just described replaces the delay locked tracking loop of conventional GPS receivers. Station Keeping in the present invention is incorporated into a secondary process referred to a fine acquisition, and will be described infra.

Fine Acquisition

The object of this subsystem is to refine the coarsely acquired code and frequency parameters and maintain fine acquisition for as long as the satellite is visible, the latter a process is referred to as Station Keeping.

Let us assume, for example that the sampling frequency $f_s$=100 MHz. Then $K_s$=100,000 and the number of samples in m(t) corresponding to one element of M(t) will be slightly under 100. Then the coarse acquisition process, with its half chip code accuracy, will have acquired the m code to within approximately ±50 elements of m only. The fine acquisition processing is designed to acquire the code to within one element of m or so. This is accompanied by a frequency search which aims to refine frequency knowledge down to ±50 Hz of true value.

The fine acquisition process is identical to the coarse acquisition process and can be illustrated exactly by FIG. 5, except that the search ranges are different. The horizontal range of 2046 half chips is now replaced by ±50 elements of m and the vertical range has 10 frequency bins of 50 Hz each. This is the fine acquisition search range.

This search also needs to be done only once, during initial acquisition. Thereafter that, to keep things lined up properly, it must be done only once every 10 or 20 milliseconds and only over reduced ranges, compatible with the expected drifts the parameters can experience between updates. This will usually be just a few m code elements and over a very small range of frequency. This secondary processing is the essence of Station Keeping.

The physical implementation of the above described process is entirely identical to that of the coarse acquisition hardware shown in figure in FIG. 6, except that it is done over the fine acquisition search range.

Each possible pair of m and $f_m$ values generates a separate output S. The largest value of S so produced defines the values of m and $f_m$ which are closest to the true values. At the close of these operations the system has m code knowledge down to about one element of m and frequency to within about ±25 Hz. Even though the two acquisition hardwares are identical, two such systems have to be physically built since their operations overlap in time and are not compatible in ranges and execution rates.

Once fine acquisition has been completed, its operations are invoked only periodically for Station Keeping which employs a much reduced search range. It should be pointed out at this stage that a further refinement of the frequency estimate is done in the Phase Acquisition process which follows next and which brings frequency knowledge down to better than 1 Hz of its true value. It is this accurate value of frequency together with a few elements of the m code that will be used in Station Keeping.

The whole object of the last three sub-systems was to glean accurate estimates of the modulations superimposed on the received signals and of their frequencies. Thus the signal $S_x$ emerging from the front end and sampled at frequency $f_s$ can be expressed by:

$$S_x(n) = \sum_{i=1}^{Nv} A_i m_i(n) D_i \sin\left(2\pi \frac{f_{sig}}{f_s} n + \varphi_i\right) + \text{Noise} \quad (3)$$

where Nv is the number of visible satellites. The effect of the two modulations $m_i$ and $D_i$ on the signal is to spread its energy over a large frequency band, their removal concentrates all the energy at one frequency and consequently provides an easy means of detection. Both modulations are composed only of the numbers +1 and −1. So if the sequence $m_i$ is known precisely, multiplication of $S_x(n)$ by this $m_i$ will remove the modulation from the signal (since +1*+1=+1 and −1*−1=+1). A secondary effect of this operation is that the resultant signal has been concentrated at $f_{sig}$ and is now at least 100 times stronger than all others. So to a very good approximation $$sig_i = S_x(n) \cdot m_i(n) = A_i D_i \sin\left(2\pi \frac{f_{sig}}{f_s} n + \varphi_i\right) + \text{Noise} \quad (4)$$

The data modulation $D_i$ is so slow that its removal is performed by other means and is relegated to the next process—the Phase Acquisition.

Phase Acquisition

The input here is $sig_i$ as shown in equation 4, except that to start with it can be assumed that $D_i$ is a constant, if the processing will be shorter than the duration of one $D_i$ code chip (20 milliseconds), which will usually be the case. Thus the hardware representing phase acquisition processing shown in FIG. 7 has as its input the parameter $X(n)$, which is the same as $sig_i$ with $D_i$ removed. The pre-processing subsystems have also provided us with an estimate of the frequency $f_{sig}$ stored in $f_m$, which will be within ±25 Hz of $f_{sig}$. Correlating $X(n)$ with the two quadrature signals $$\cos\left(2\pi \frac{f_{sig}}{f_s} n\right) \text{ and } \sin\left(2\pi \frac{f_{sig}}{f_s} n\right)$$

in multipliers 36 and 37 and then summing the outputs over one epoch as shown in 38 and 39 will produce the two signals $X_c(k)$ and $X_s(k)$, where the parameter k enumerates consecutive epochs. After some considerable transformations it may be shown that $$X_c(k) = \left[A \cdot \frac{\sin\left(\frac{1}{2}\theta_d K_s\right)}{\sin\left(\frac{1}{2}\theta_d\right)}\right] \cos\left\{\varphi_x(k) + \varphi_s + \frac{1}{2}\theta_d(2k-1)K_s\right\} \quad (5a)$$

$$X_s(k) = \left[A \cdot \frac{\sin\left(\frac{1}{2}\theta_d K_s\right)}{\sin\left(\frac{1}{2}\theta_d\right)}\right] \sin\left\{\varphi_x(k) + \varphi_s + \frac{1}{2}\theta_d(2k-1)K_s\right\} \quad (5b)$$

where $$\theta_d = 2\pi \frac{f_d}{f_s} = 360 \frac{f_d}{f_s} \text{ and } f_d = f_{sig} - f_m$$

and $\varphi_s$ is a phase shift due to the unknown initial point at which the signal began to be sampled.

Figure 7:
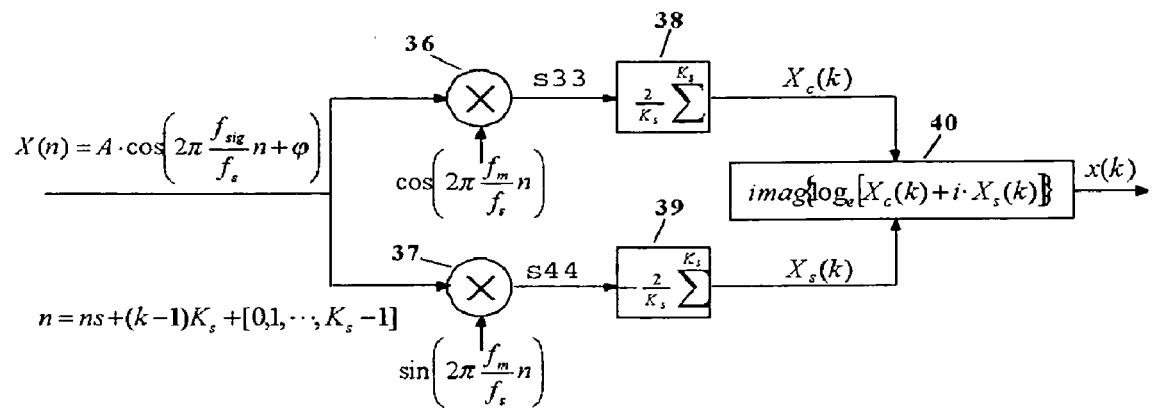
FIG. 7 depicts a schematic diagram of a phase correlator subsystem of the present invention.

Then the output of FIG. 7, ie. the computations shown in 40 is $$x(k) = imag[\log_e(X_c(k) + j \cdot X_s(k))] \quad (6a)$$
$$= \frac{1}{2}\theta_d(2k-1)K_s + \varphi_s + \varphi_x(k)$$
$$= (K_s\theta_d) \cdot k + \left(-\frac{1}{2}K_s\theta_d + \varphi_s + \varphi_x(k)\right)$$
$$= c(1) \cdot k + c(2) \quad (6b)$$

where $$c(1) = K_s\theta_d = K_s \cdot 360 \frac{f_d}{f_s} = 0.36 \cdot f_d \text{ and}$$

$$c(2) = \left(-\frac{1}{2}K_s\theta_d + \varphi_s + \varphi_x(k)\right)$$

As can be seen, that the slope $c(1)$ of the output of phase correlator (FIG. 7) $x(k)$ taken over a number of epochs, is very simply related to the difference frequency $f_d$. Thus slightly changing the estimate $f_m$ until the slope $c(1)$ becomes zero adjusts $f_m$ to be a very good approximation of $f_{sig}$. The accuracy with which this can be achieved is within a fraction of one Hz. This is the process used to get the final refinement of the frequency estimate.

The slope of $x(k)$, $c(1)$, is a constant, which approaches zero as $f_d$ approaches zero and is the same for all four antennae. The constant part of $c(2)$ is composed of the $\varphi_x(k)$ phase parameter, the object of this whole exercise, plus two additional terms: $-\frac{1}{2}K_s\theta_d = -\frac{1}{2}c(1)$, plus $\varphi_s$ an unknown quantity, but the same at all four antennae. We can therefore form phase differences at selected antenna pairs. Let then such a difference between antennae i and j be denoted by $p_{ij}$, then $$p_{ij} = x_i(k) - x_j(k) = \varphi_{xi}(k) - \varphi_{xj(k)} \quad (7)$$

It will be noted in the difference between phase correlator outputs all terms, except the true phases at the sinusoids collected at antennae i and j, disappear. These are the phase differences needed to compute the attitude angles.

But before moving to the attitude angle computations the issue of the data modulation D must first be settled. A data transition of this modulation will occur on an epoch boundary and can happen only once every 20 epochs. A transition is from a +1 to a −1 or vice versa, which will imply a 180° phase change. Such a change will be clearly visible be inspection of the phase estimates of two consecutive epochs. So the procedure is to monitor the phases of all consecutive epochs and when a 180° transition occurs, compensate for it by reversing the transition. This eliminates the data modulation. If it is so desired, these transitions can be noted and their record kept, thus providing a means of reading ephemeris data, which then can be used to provide conventional GPS outputs.

Attitude Angles from Phase Differences

Figure 8:
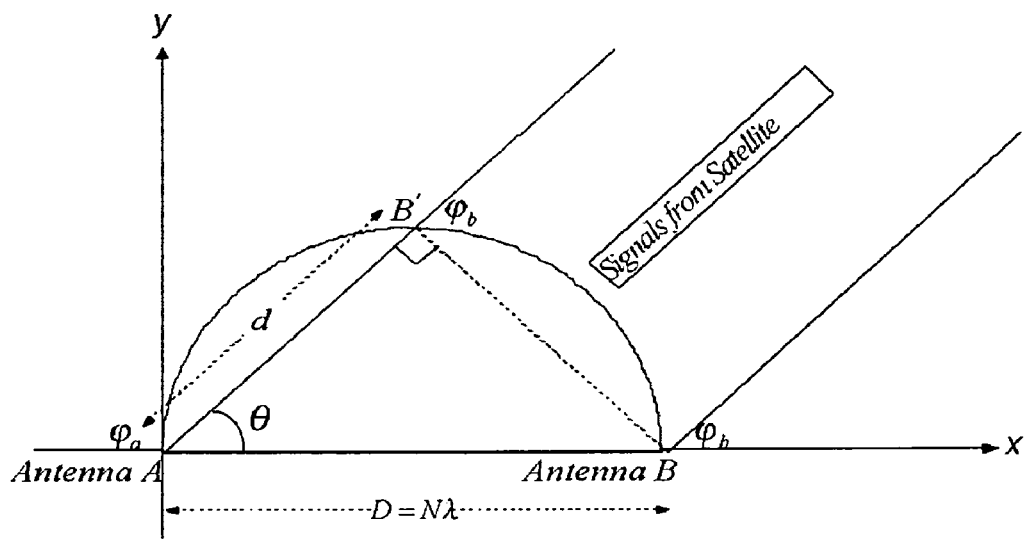
FIG. 8 depicts the geometry of a system including antennae at A and B and a signal from a satellite.

There exists a simple relationship between the phase angles measured at each of a number of antennas and the attitude angles of the antenna platform to the satellite transmitting the signal. The underlying concepts are well illustrated by considering the two antenna arrangement shown in FIG. 8.

The range to the satellite is so large in comparison to the antenna spacing that the two rays impinging on the antennas can be considered parallel. With that assumption, the geometry as shown in the figure will hold and the elevation angle θ will be related to the distances d and $D_{AB}$ by $$\cos(\theta) = \frac{d}{D_{AB}} \quad (8)$$

The phase measured at points B and B' will be the same, therefore the phase difference between the antennas $p_{AB} = \varphi_a - \varphi_b$, and the phase shift $P_{AB} = 2\pi N\lambda$ that would occur when the signal travels the distance $D_{AB}$ are related by the same equation $$\cos(\theta) = \frac{p_{AB}}{P_{AB}} = \frac{\varphi_a - \varphi_b}{2\pi N\lambda} \quad (9)$$

$P_{AB}$ is known because the antenna separation and the signal frequency are known and therefore, once the phase difference $p_{AB}$ has been measured, the attitude (elevation in this case) angle $\theta$ is immediately established by use of equation (9).

The derivation of the three dimensional case is somewhat more involved, but the results are equally straightforward. Let us assume that four antennas are being used, arranged at the four compass points East, West, South and North (no relation to real geodetic directions), then $$\cos(\theta) \cdot \sin(\phi) = \frac{d_{EW}}{D_{EW}} = \frac{p_{EW}}{P_{EW}} \quad (10)$$

$$\cos(\theta) \cdot \cos(\phi) = \frac{d_{SN}}{D_{SN}} = \frac{p_{SN}}{P_{SN}}$$

where $\theta$ is the elevation angle and $\phi$ the azimuth angle to the satellite. Solution of equations (10) gives the desired attitude angles. It can be shown that three antennas are sufficient to determine attitude angles from phase differences. Any number of antennas, larger than three will do the job as well and the larger that number the more signal is gathered and the better the noise rejection, at the expense of additional signal processing.

There is however a complication with the proposed process. Measurements of phase and phase differences are subject to modulo 360° arithmetic. This means that true phase shifts larger than 360° cannot be measured directly and is the reason for the existence of all ambiguity problems mentioned before.

There are two ways to proceed here. One can evaluate all possible solutions only one of which will be correct. For an antenna separation of the order of two wavelengths, there will be sixteen possible solutions, which can be arranged in a four by four matrix—the Ambiguity Matrix. Then, if by any means, the true solution is found, rapid updating, with resulting small changes in the pointing direction, will make it possible to keep the correct solution in track. Even though possible, this is not a desirable procedure.

By far the more robust solution is to use a two frequency receiver, say L1 and L2 (front end shown in FIG. 4B). It can be shown that for an antenna separation of N wavelengths, the distance d will be given by $$d_{AB} = \frac{(\Delta\varphi_{mAB} + n \cdot 360)}{360}\lambda \quad (12)$$

for n=$-\overline{N}, -\overline{N}+1 \ldots, -1, 0, 1, \ldots, \overline{N}-1, \overline{N}$, where $\overline{N}$ is the smallest integer larger or to N. The true phase shift will be one of the values $\Delta\phi_{mAB}$+n·360 and $\Delta\phi_{mAB}$ is the actually measured phase difference between antennas A and B. So for a two wavelength separation of antennas there will be five possible solutions for $d_{AB}$. This set of solutions will be here referred to as the d-set.

It will be noted that the d-set is independent of the exact value of the antenna separation and since it does depend on the wavelengths of the signals, if those are different so will be the d-sets. However for all signals from the same satellite, the distances $d_{AB}$ must be the same. This true distance will be produced only by use of the true phase shift. Therefore two compatible d-sets will have two elements the same. The point at which they are equal specifies the value of n and consequently the true phase shift.

For example, for an approximately two wavelength antenna separation the following two d-sets were generated:
d-set(L1)=−52.331 −33.301 −14.272 4.7573 23.787
d-set(L2)=−49.476 −25.055 −0.63431 23.787 48.208

It can be seen that the last and one before last entries in the two sets are the same. That means that the d-sets are compatible and the true phase shift for the L1 frequency is $\Delta\phi_{mAB}$+ 2*360°. In this manner the true phase shifts can be computed, no matter what the antenna separation.

For the four antenna case, two d-sets would be generated, one for each pair of antennas. With the true phase shifts available, equations (10) can be solved and give a single unambiguous correct answer.

Overall System Configuration

Figure 9:
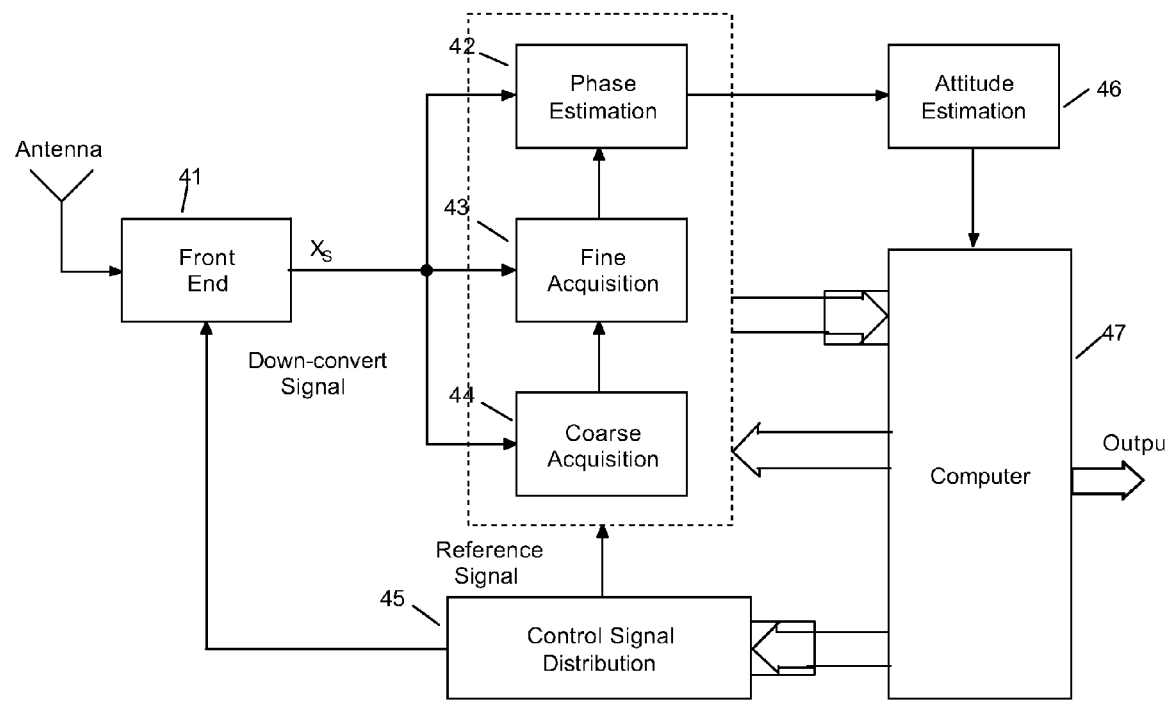
FIG. 9 depicts a block diagram of the System of the present invention.

A functional block diagram of the preferred embodiment of the entire system is shown in FIG. 9. The front end 41 and signal distribution system 45 are similar to a conventional GPS receiver and are implemented as dedicated hardware. The coarse acquisition system, 44 because of the high speed processing that will be required, have some of its parts constructed in dedicated digital hardware. The remaining sub-systems 42, 43, 46 are implemented in software, or alternatively in Field Programmable Gate Arrays (FPGAs). The function of the computer 47 is to control the operations and make intelligent choices needed for the proper operations of the sub-systems. Flow diagrams of the overall computational flows under computer control are shown in FIGS. 10, 11 and 12.

Figure 10:
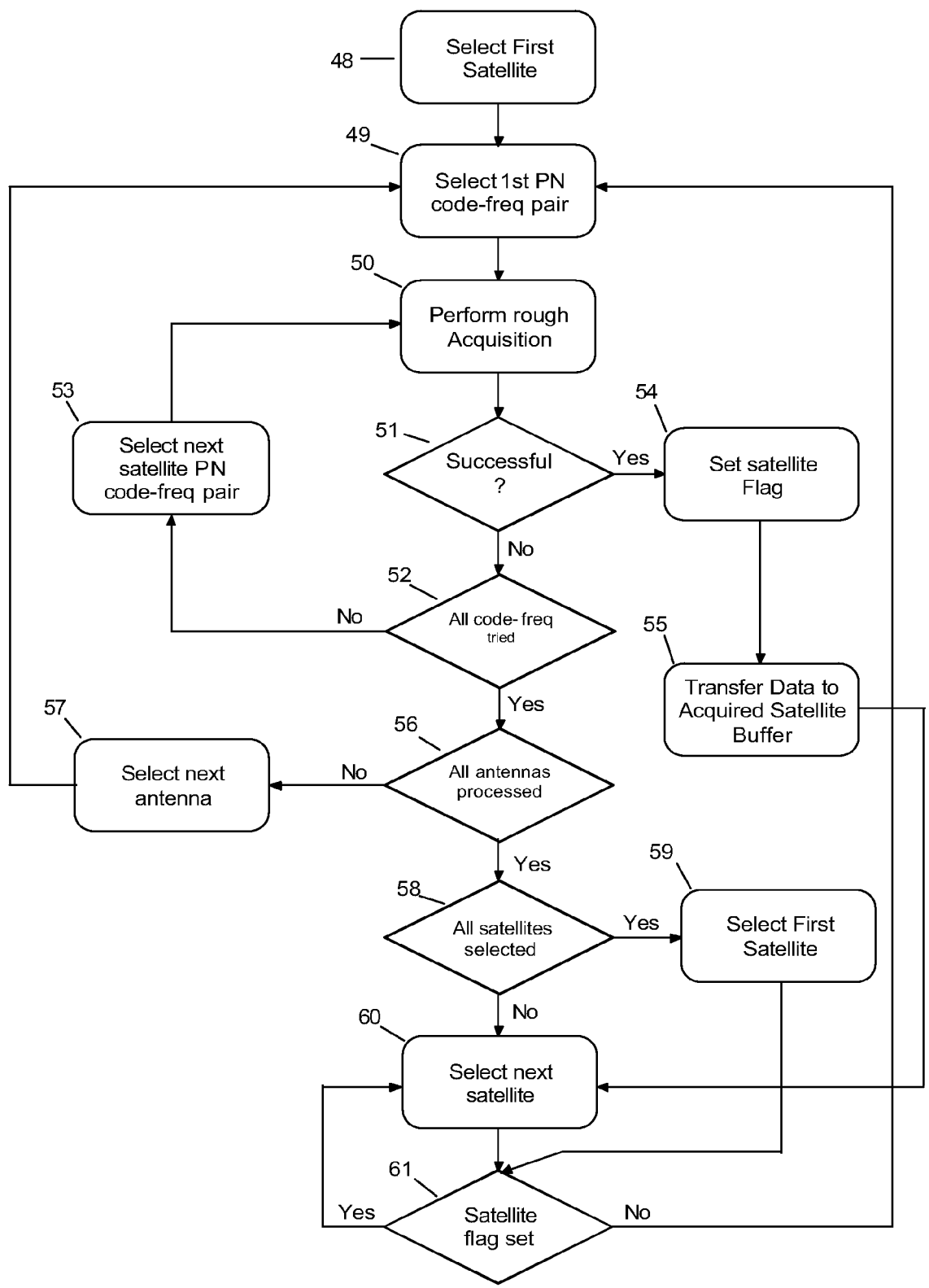
FIG. 10 depicts the flow diagram of the coarse acquisition computations and the computer actions controlling it.

FIG. 10 shows the computations that must be done for initial acquisition and the computer decisions that accompany them. On start up, the first satellite is selected 48. Next the computer generates the PN code that goes with this satellite 49. It also generates the first code phasing and Doppler frequency that will be tried in the performance of rough acquisition. Next the first try at acquisition is performed 50. The loop starting at 50 and then continuing to 51, 52, 53 and back to 50 tests whether the acquisition was successful and if not goes on to the second codephase-frequency pair to be tried. This loop executes until either a successful acquisition was obtained or all possible codephase-frequency pairings have been exhausted. If no acquisition was achieved the system goes to 56, then 57 selecting the next antenna and starts at 49 again. First time through these two loops the acquisition computations depicted in FIG. 6 are done for a single epoch's worth of integration. When all antennae have been tried and no acquisition was recorded, the system return once more to 49, performs all the computations just described, but now for two epochs worth of integration. Thereafter the same is repeated for three, four and five epochs worth of integration, provided there was no successful acquisition at any stage during these calculations. If, however a successful acquisition is achieved at any stage during the above calculations, the system stops and exits to 54. At that point a flag is set which essentially puts the acquired satellite number into a special memory, the satellite buffer, which contains acquired satellites and their current data. Next, in 55, all relevant data pertaining to that satellite like PN code phasing, frequency estimate and signal strength are also transferred to that buffer. On completion of that action the system selects the next satellite in line whose flag has not been set, 60 and 61. That same stage is also reached if 56 exits with the yes arrow. The system then returns to 49 and the process starts over again for the next satellite. This looping through all satellites goes on sequentially for as long as the system is running. The reason for this is that satellites that at one point in time were not visible, may become visible as time goes on and it is important to ketch them just after they become visible. This usage will ensure that the largest number of satellites possible will always be acquired.

Figure 11:
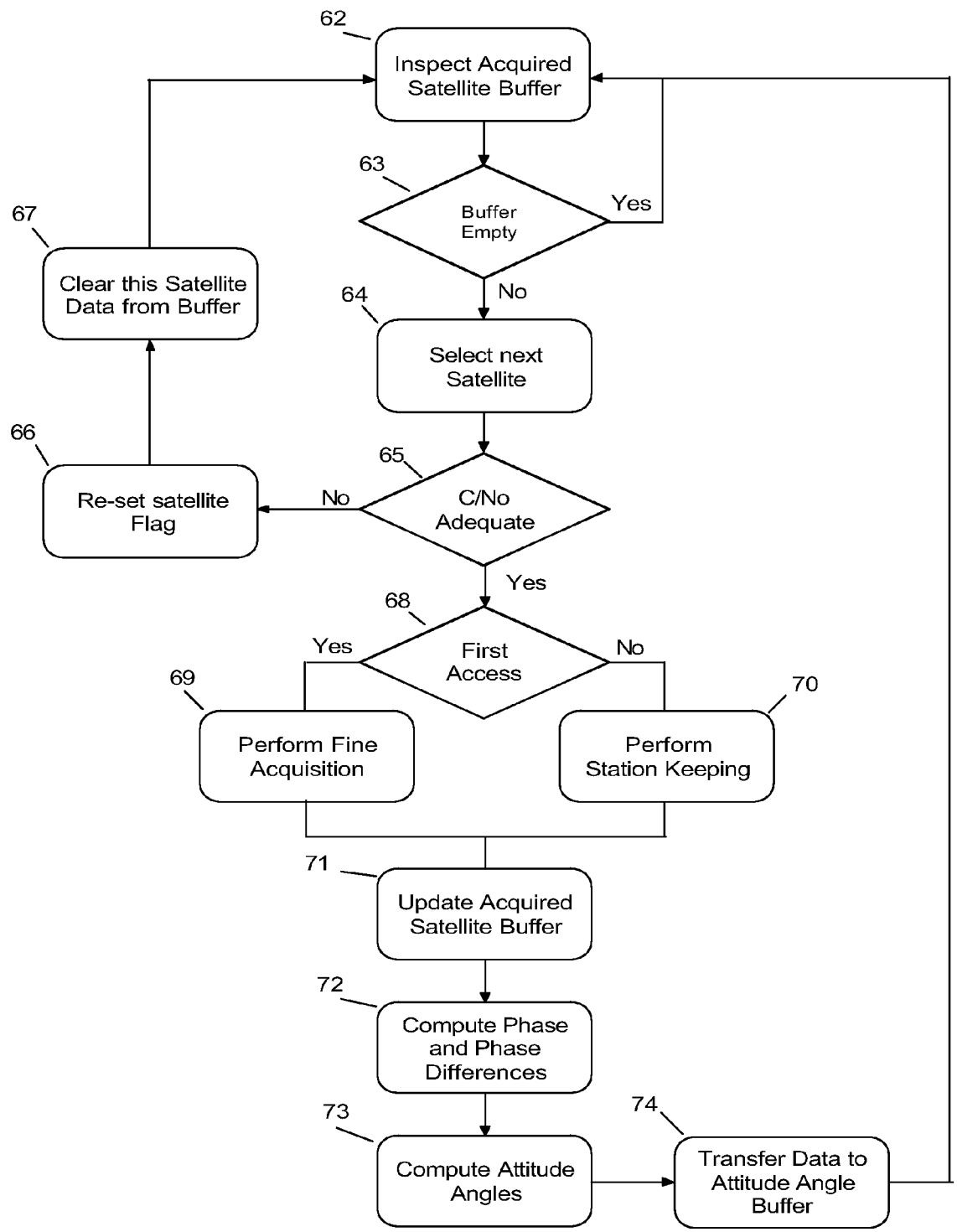
FIG. 11 depicts the flow diagram of the phase angle, phase differences and attitude angle computations and the computer actions controlling it.
Figure 12:
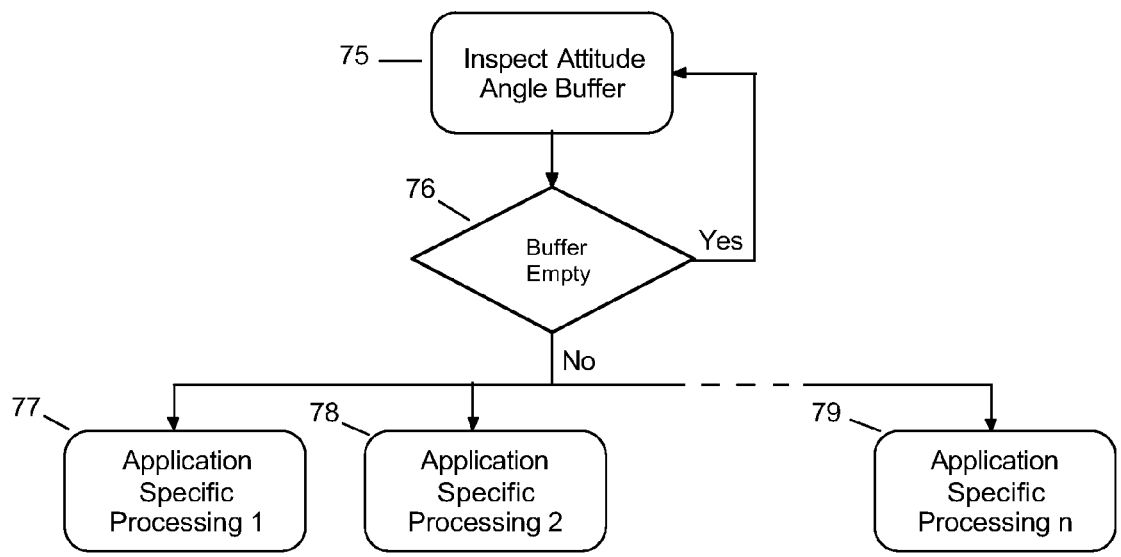
FIG. 12 depicts the flow diagram of final output computations and the computer actions controlling it.

FIG. 11 starts with an examination of the satellite buffer containing all current information available about all acquired satellites. The initial loop 62, 63 is executed as long as the satellite buffer is empty. Once that is no longer so, the system goes to 64 and selects the next satellite in the buffer queue. If the signal to noise ratio is adequate, as tested in 65, fine acquisition is performed 69, if this was the first access of this satellite or, if not, Station Keeping is performed in 70. In either case as new more accurate data is produced, the satellite buffer is updated in 71, to keep the information available there, as current as possible. Next the phase angles, the phase angle differences and the resulting attitude angles of the antenna platform to the satellite are computed in 72 and 73 and all that information is transferred to a sub-section of the satellite buffer referred to as the Attitude Angle Buffer, this is done in 74.

However in 65, if the current signal to noise ratio (C/No) has fallen below and an acceptable value, that satellite is removed from the acquired satellite list, by resetting the satellite flag to not present in 66 and clearing all the data about that satellite in the buffer memory 67.

FIG. 12 shows the final control flow for the output calculations that are pertinent to a specific application. The 75, 76 loop stays active as long as there is no information in the buffer. Once that is no longer the case the system proceeds to the application specific processing. The choice of the type of this processing would be preset in the computer and could be any one of a number of different processes, all of which require accurate attitude information as input.

The primary interest here is the accurate pointing at the MILSTAR satellite. So let us assume that process number 1 deals with this issue.

Figure 13:
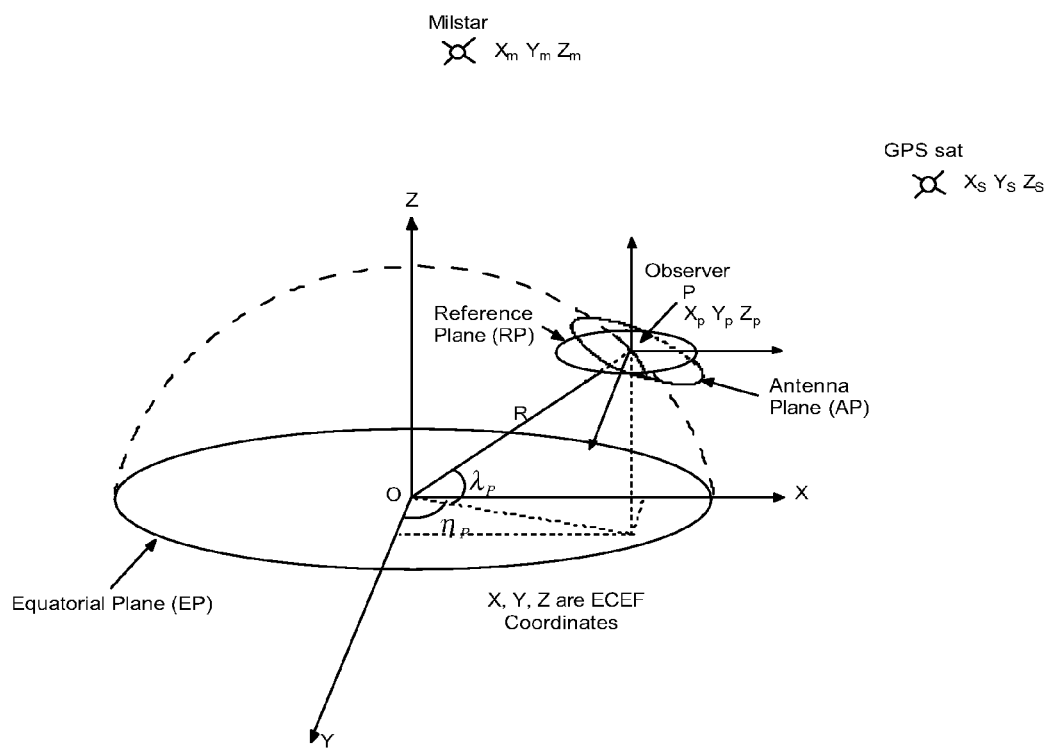
FIG. 13 depicts the coordinates of various elements of interest and the relative orientations of various planes.

FIG. 13 shows the coordinate of the various elements of interest here. It is assumed that the observer is at a point P on the earth surface and the reference plane has its center at P, but is parallel to the equatorial plane and its x, y, z axes are parallel respectively to the X, Y, Z axes of the ECEF system.

Both the MILSTAR and all GPS satellite ECEF coordinates are known. It is then just a matter of subtraction to translate all of these into the Reference Plane (RP) coordinates. The system designed here will give the azimuth and elevation angles to any GPS satellite from the Antenna Plane (AP) and so all that is required is the distance from the observer to the GPS satellite, to determine the AP satellite coordinates. If the distance to four satellites can be estimated, the ECEF coordinates of the observer (point P) can be computed. The usual way to get these distances is to use the ephemeris data. This is the conventional GPS way of determining position. For the current application this is not necessary, but can certainly be done here as well. It can be shown that if position inaccuracy alone was the sole source of error, a pointing accuracy of 0.01° to any GPS satellite is achievable for random position deviations of up to 3.5 km. Thus, since pointing accuracy is at issue here, position knowledge can be quite coarse. A ±300 meter position accuracy can be had by just measuring the Doppler shift of the satellites, considering that the satellites orbits are well known.

So it is possible to establish the RP and AP coordinates of the GPS satellite quite readily. Similarly the coordinates of the MILSTAR satellites, Xm,Ym,Zm, in ECEF can be translated into the Reference Plane coordinates by merely subtracting the observer coordinates Xp,Yp,Zp from them. We now have the MILSTAR and the satellite coordinates in the same coordinate system (that of the Reference Plane) and we have the same satellite coordinates in the Antenna Plane. Both the Reference Plane and the Antenna plane have the same origin—the Observer. So the connection between the two planes is a 3-dimensional rotation matrix. Once this becomes known, the coordinates in one of these planes can be translated into those of the other plane by a multiplication by the rotation matrix.

There are a number of ways to obtain the rotation matrix from the data available here. The following method is one of the more straightforward.

Let the rotation matrix be denoted by R, then $$R = \begin{bmatrix} R_{11} & R_{12} & R_{13} \\ R_{21} & R_{22} & R_{23} \\ R_{31} & R_{32} & R_{33} \end{bmatrix} \tag{11}$$

Any position vector in the antenna plane $$\begin{bmatrix} X_a \\ Y_a \\ Z_a \end{bmatrix}$$

is then related to any position vector in the reference plane $$\begin{bmatrix} X_r \\ Y_r \\ Z_r \end{bmatrix}$$

by $$\begin{bmatrix} X_a \\ Y_a \\ Z_a \end{bmatrix} = \begin{bmatrix} R_{11} & R_{12} & R_{13} \\ R_{21} & R_{22} & R_{23} \\ R_{31} & R_{32} & R_{33} \end{bmatrix} \begin{bmatrix} X_r \\ Y_r \\ Z_r \end{bmatrix} \tag{12}$$

Let us now assume that three satellites have been observed and their position vectors in both the Antenna Plane and the Reference Plane are known, let these vectors have the consecutive subscripts 1, 2 and 3, then the following equation must also hold:

$$\begin{bmatrix} X_{a1} & X_{a2} & X_{a3} \\ Y_{a1} & Y_{a2} & Y_{a3} \\ Z_{a1} & Z_{a2} & Z_{a3} \end{bmatrix} = \begin{bmatrix} R_{11} & R_{12} & R_{13} \\ R_{21} & R_{22} & R_{23} \\ R_{31} & R_{32} & R_{33} \end{bmatrix} \cdot \begin{bmatrix} X_{r1} & X_{r2} & X_{r3} \\ Y_{r1} & Y_{r2} & Y_{r3} \\ Z_{r1} & Z_{r2} & Z_{r3} \end{bmatrix} \tag{13}$$

Since these are square matrices and consequently invertible $$\begin{bmatrix} R_{11} & R_{12} & R_{13} \\ R_{21} & R_{22} & R_{23} \\ R_{31} & R_{32} & R_{33} \end{bmatrix} = \begin{bmatrix} X_{r1} & X_{r2} & X_{r3} \\ Y_{r1} & Y_{r2} & Y_{r3} \\ Z_{r1} & Z_{r2} & Z_{r3} \end{bmatrix}^{-1} \cdot \begin{bmatrix} X_{a1} & X_{a2} & X_{a3} \\ Y_{a1} & Y_{a2} & Y_{a3} \\ Z_{a1} & Z_{a2} & Z_{a3} \end{bmatrix} \tag{14}$$

All coordinate translation matrices are orthogonal and unitary, which implies that their inverses are equal to their transposes, so $R^{-1}=R^T$ and so translation in either direction from Antenna Plane to Reference Plane or vice versa is readily accomplished once R is known.

The above process, or some other equivalent one, would then form the operations executed for MILSTAR pointing. It should also be noted that a universal 3-D compass would be based on an identical procedure.

Resolution of the Problems of Conventional GPS Receivers
  Loop Settling Times

In prior art GPS receivers there are three sources of potential delays: the finite bandwidth of closed loops, the Carrier to Noise density $C/N_o$ of the received signal and the processing time of the required algorithms. There are no closed feedback loops in the proposed system, so all problems connected with them are absent. The $C/N_o$ imposed delays are here present as well. They have been shown, experimentally to lead to a 5-millisecond latency in output. Therefore an update rate 200 times a second becomes possible.

Effective Noise Suppression

Efforts to suppress noise should only be undertaken if they are absolutely essential for the success of the overall objective. For the $C/N_o$ values available from the GPS satellites all objectives can be met by the proposed system without any additional noise suppression schemes.

Integer and Phase Ambiguity

The integer ambiguity is a non-issue here, no use is made of the distance from receiver to satellite expressed in terms of the number of wavelengths of the signal. The phase ambiguity has been totally resolved for any antenna separation by using a dual frequency front end as explained above.

Range Accuracy and Differential Delays

It was pointed out, in conjunction with equation 12 above, that distance determination does not depend on the knowledge of the antenna separation. Furthermore, since in the final analysis the correct distance d is now expressed in terms of attitude angle accuracy, which is known to have an RMS value of around 0.1° for an antenna separation of 2λ and better than that as the separation increases, the effective accuracy of the thus established distance d, if expressed in units of distance is extremely high. Since 1 mm corresponds to 1.89°, 0.1° means distance knowledge to about 0.05 mm. This can now be used to very accurately estimate the antenna separation and as a matter of fact do so continuously correcting any temperature induced variations as they occur. All that has to be done is to acquire the MILSTAR satellite, this gives the attitude angles, then from the relationships specified by equation (11), the separation can be established, again with the same accuracy as that of d. This process is effectively a very accurate distance tracking procedure.

Differential, delays have to be treated in two stages. The first would be after construction of the system and would have to be done only once. Since these delays will be largely constant, a calibration procedure will be able to eliminate them to a large degree. The remaining residual effects and especially those resulting from temperature changes will be sufficiently small that their effect on the attitude angle accuracy can also be eliminated by the above described distance tracking procedure.

Receiver Costs

By far the most expensive part of the proposed system will be the front end and control signal distribution system. These will contain amplifiers, filters and mixers, and other analog components, all of which are usually much more expensive than dedicated digital signal processing components which would be needed for the remainder of the system. The production costs of this system in large quantities should, in to-day's dollars, be of the order of $1000.

Thus, the benefits of the present approach are not only the ability to make the required calculations at a speed required for the stabilization of a moving platform under very rigorous conditions of speed and maneuverability, but do so in an economically feasible way.

While certain embodiments and examples have been used to describe the present invention, many variations are possible and are within the spirit and scope of the invention. Such variations will be apparent to those skilled in the art upon inspection of the specification and claims herein. Other embodiments are within the following claims.

The invention claimed is:

1. A method for acquiring source signals in a receiver for receiving and interpreting source signals originating from a plurality of sources, each source signal comprising a code portion and a data portion, the codes of the code portions being chosen such that when the receiver correlates the code portion of a signal from a particular source with a matching code stored in a memory, a substantially increased signal is generated, and wherein each signal frequency comprises a base frequency, corrupted by a Doppler shift, the receiver comprising a heterodyne module for converting each of the source signals to a down-converted signal comprising the code and data portions of the corresponding source signal, wherein the code portions comprise a multiplicity of chips, a sampler to convert each down-converted signal into binary signal groupings, and a memory in which code sequences that identify each of the source signals is stored, the method comprising:

(1) sampling said down-converted signals at a rate substantially higher than a chip rate; and
  (2) performing a coarse correlation of the code portions of said sampled signals with the matching code sequences stored in the memory, thereby identifying available source signals, by the steps comprising:
    (a) shifting the phase of the stored code sequences;
    (b) multiplying the phase-shifted stored code sequences by a First Signal at frequency ω, the base frequency plus a Doppler angular frequency of a current search bin, thereby producing signal s11;
    (c) multiplying signal s11 by said sampled down-converted signal producing signal Q;
    (d) summing the results of steps (a) through (c) over an epoch, wherein the epoch comprises a plurality of chips; and
    (e) passing the summed results through a non-linear device, producing signal Qn;
    (f) creating a Second signal in quadrature with the First signal;
    (g) multiplying the phase-shifted stored code sequences by the Second signal, producing signal s22;
    (h) multiplying signal s22 by said sampled down-converted signal producing signal I;
    (i) summing the results of steps (f) through (h) over the epoch;
    (j) passing the summed results through a non-linear device, producing signal In; and
    (k) summing signals In and Qn, producing a test signal,
  wherein the performing of said coarse correlation, over a range of different values of frequencies ω, is performed without using any feedback loops, and wherein the performing of said coarse correlation results in the selection of a coarse range of base plus Doppler frequencies, each base plus Doppler frequency designated hereinafter as a Doppler cell, and further results in the calculation of a coarse range of phase-shifted stored code sequences for all GPS satellites in view.

2. The method of claim 1, wherein the sources source signals are from GPS satellites.

3. The method of claim 2, wherein the codes are PN codes.

4. The method of claim 3, wherein the coarse acquisition is performed to a precision of one-half a chip, and wherein the fine acquisition is performed to a precision of 1/100 of a chip.

5. The method of claim 1, further comprising using parallel processing to increase the speed of each coarse correlation.

6. The method of claim 5, wherein the parallel processing is performed in a multiplicity of parallel channels, wherein each parallel channel performs a correlation in parallel with the other channels, within in a single clock cycle, with the search being done in half chip steps for all possible combinations of Doppler cells and stored code sequences.

7. The method of claim , further comprising performing fine correlations of the code portions of said sampled signals with matching code sequences stored in the memory thereby identifying available sources by the steps comprising performing the steps (a) through (k) of claim 8 over the range of values of Doppler cells and coarse range of phase-shifted stored code sequences resulting from the coarse acquisition; wherein the performing of said fine correlation, over a range of different values of frequencies ω, is performed without using any feedback loops; and wherein the performing of said fine correlations results in the selection of a single Doppler frequency and a single phase-shifted stored code sequence.

8. The method of claim 7, further comprising using parallel processing to increase the speed of fine correlations.

9. The method of claim 7, wherein the parallel processing is performed in a multiplicity of parallel channels, wherein each parallel channel performs a correlation in parallel with the other channels, within in a single clock cycle, with the search being done for all possible combinations of Doppler cells and code phases, whereby a correctly-phased code is determined.

10. The method of claim 9, further comprising performing the extraction of phase from the acquired GPS signals by steps comprising:
   (1) the stripping of the code portion from the source signals by multiplying the source signals by the correctly phased code;
   (2) the multiplying a code-stripped signal by two quadrature sinusoidal components at a best estimate of the signal frequency and so forming signals s33 and s44;
   (3) the summing of signals s33 and s44 over one epoch's worth of data to produce the signals Xc and Xs; and either
   (3) calculating: $\tan^{-1}(Xs/Xc)$; or
   (4) calculating the value: $\mathrm{imag}[\log_e(Xc+iXs)]$, where i is the square root of minus one, wherein the performing of said extraction of phase is performed without using any feedback loops.

11. The method of claim 10, further comprising performing the steps of claim 10 for a plurality of epochs, and using parallel processing to increase the speed of the extraction of phase.

* * * * *